Jan. 20, 1953 J. M. FREIBERG 2,626,050
FOLDING SHIPPING FRAME FOR GLASS
Filed Jan. 8, 1952 2 SHEETS—SHEET 1

INVENTOR.
James M. Freiberg

BY Oscar L. Spencer
ATTORNEY

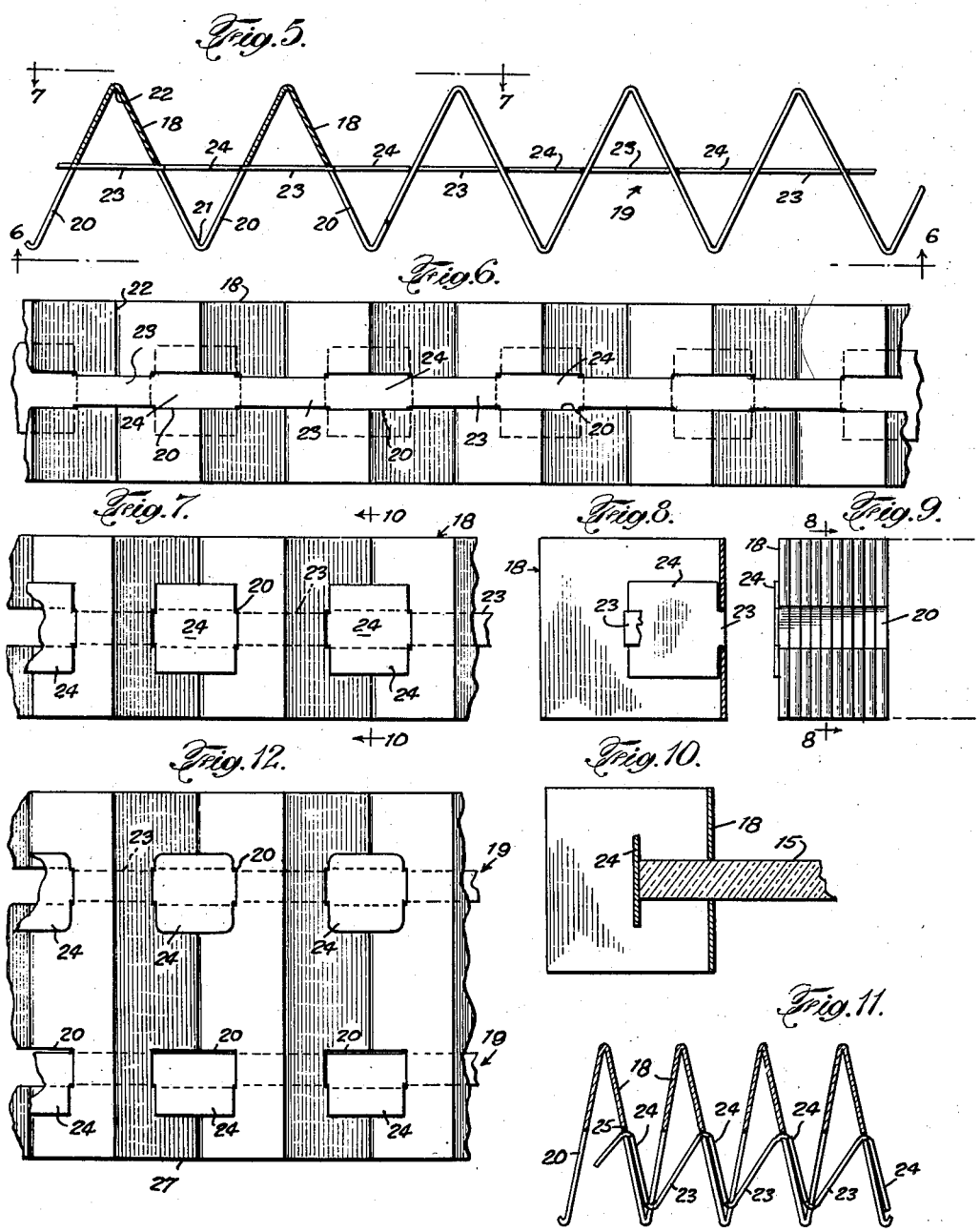

Patented Jan. 20, 1953

2,626,050

UNITED STATES PATENT OFFICE 2,626,050

FOLDING SHIPPING FRAME FOR GLASS

James M. Freiberg, New Kensington, Pa., assignor to Pittsburgh Plate Glass Company, Pittsburgh, Pa., a corporation Application January 8, 1952, Serial No. 265,390

14 Claims. (Cl. 206—62)

This invention relates to a cushioning edge packing and shipping frame for plate glass and the like. More particularly the invention relates to an edge packing comprising compactly interfolded, elongated strips of sheet material which is adapted to be extended and applied to the periphery of plate glass and the like to form a cushioning shipping frame that provides mechanical protection for the edge of the glass and also serves to support the glass securely within a shipping container.

Sheets of glass commonly are shipped in wooden boxes, the glass being protected within the box by wrappings and by packings of bulky corrugated paper pads or straw. Attempts have been made heretofore to substitute supports and spacing members, usually made of corrugated paper board, for the bulky packing materials. These supports and spacing members generally are open to objection because they do not provide adequate protection for the glass, or because they are bulky to store, or expensive to manufacture, or for other reasons.

It is an object of the present invention to provied an improved cushioning edge packing for glass sheets and the like which is folded compactly at the time of manufacture for storage, and which can be quickly and easily extended and wrapped entirely around the edge of the glass sheet and secured thereon to form a shipping frame. It also is an object of the invention to provide a folding edge packing which can be made from non-corrugated paper board, and which will provide a cushioning shipping frame around the entire periphery of the glass sheet for suspending and holding the glass securely within the shipping container. A further object of the invention is to provide a paper board edge packing in which no adhesive or metal fastenings need be employed. Another object is to provide an improved shipping frame for plate glass and the like. Still another object of the invention is to provide economies in the packaging of glass sheets for shipment. Other objects and advantages of the invention will appear hereinafter.

A preferred embodiment of the invention selected for purposes of illustration is shown in the accompanying drawings, wherein:

Figure 5 is a top plan view of the cushioning edge packing fully extended to the limit of its length, similar to Figure 1, but shown to larger scale for a better disclosure of the construction;

Figure 6 is a side elevation of the cushioning edge packing shown in Figure 5, taken substantially on the line 6—6 of Figure 5;

Figure 7 is a side elevation of the cushioning edge packing shown in Figure 5 from the opposite side, taken substantially on the line 7—7 of Figure 5;

Figure 8 is a vertical section through the compactly folded edge packing, substantially on the line 8—8 of Figure 9;

Figure 9 is a side elevation of the edge packing in its compactly folded form, as for storage;

Figure 10 is a sectional view taken substantially on the line 10—10 of Figure 7, but to enlarged scale;

Figure 11 is a top plan view of the edge packing of Figure 5, to slightly smaller scale, showing the edge packing only partially extended; and Figure 12 is a side elevation, similar to Figure 7, of an edge packing which is adapted to hold two sheets of glass in spaced parallel relation.

The cushioning edge packing of the present invention comprises two accordion pleated strips formed from elongated blanks of sheet material such as flat paper board. These accordion pleated blanks are assembled in interlocked folding relation such that they can be compactly folded at the time of manufacture to take up a minimum amount of space for storage and for shipment to the point of use, and such that they can be readily extended for application to the periphery of glass to form a shipping frame therefor. The blanks may be made of flat uncorrugated sheet material and yet provide effective protection and cushioning for the edge of the glass. The two blanks of which the edge packing is comprised are assembled in interlocking, folding relation without adhesive or metal fastenings. This is an important advantage because adhesives ordinarily used for paper products of this type are likely to stain or etch glass, and the use of metal fastenings to secure the parts of the edge packing together may scratch or chip the glass. The cushioning edge packing of the present invention may be used for forming shipping frames on flat sheets of glass, or on curved sheets such as automobile windshields. The entire periphery of the glass is protected by the edge packing and the glass is gripped and suspended around its entire edge. In some cases this may permit shipment of glass in corrugated paper boxes instead of wood boxes, and the use of heavy corrugated packings and straw may be unnecessary. The cushioning edge packing of the present invention may be used for forming shipping frames for sheets of glass, for mirrors, and for other plate or sheet materials including metals and plastics, where protection of the edges and secure suspension of the material within a shipping container are important. It may be used for single sheets, or for a plurality of sheets stacked in face to face relation.

Figure 1:
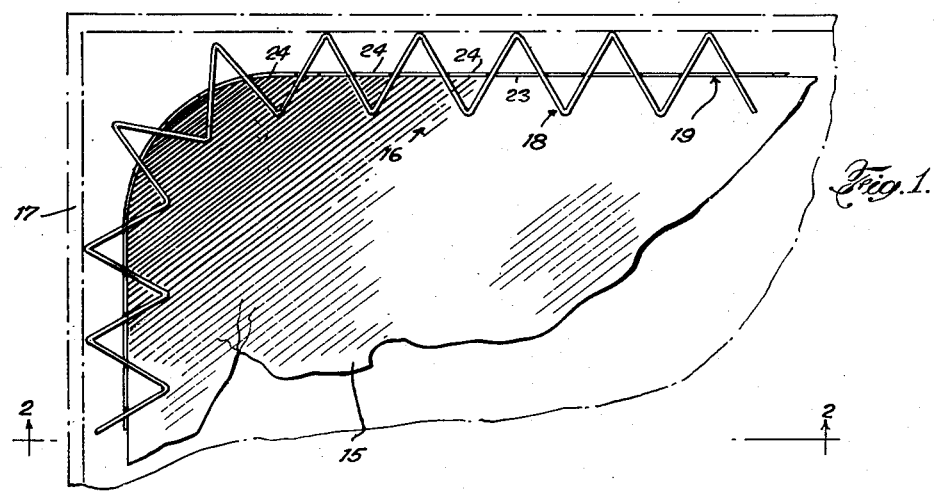
Figure 1 is a fragmentary top plan view of a sheet of glass or the like showing the cushioning edge packing applied to the edge of the glass to form a shipping frame therefor, the shipping container being shown in dot-dash lines.
Figure 2:
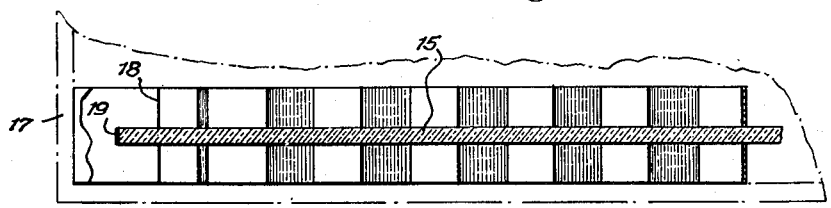
Figure 2 is a sectional view taken substantially on the line 2—2 of Figure 1.

Referring to the drawings, Figure 1 is a view looking down on a sheet of glass 15 which is suspended in a shipping frame 16 comprised of the cushioning edge packing of the present invention. The carton or shipping container for receiving the glass, with the shipping frame thereon, is shown in dot-dash lines at 17. As can be seen in Figures 1 and 2, the edge packing comprises a partially extended, accordion pleated strip 18, alternate folded edges of which have aligned slots forming a groove along one side of the accordion pleated strip in which the edge of the glass is received, and another strip 19 lying in the bottom of the groove extended along the edge of the glass. Preferably the edge packing will extend entirely around the periphery of the glass and the ends thereof will be fastened together by staples, adhesive, or adhesive tape, or they will be interlocked, to complete the shipping frame. If staples or adhesive are used for fastening the ends of the edge packing together they can be employed along the outer edges of the packing where there is little danger that they will ever come into contact with the glass.

The strips 18 and 19 are made from flexible material which is softer than the sheet or plate which is to be supported, so that the edge packing will not scratch or chip the sheet, and of material which will not react with the material of the sheet to stain or etch it. The strips may be made, for example, from flat paper board and because of the substantially continuous extended engagement of the edge packing with the periphery of the sheet it will be possible to use much thinner material than has heretofore been considered suitable for forming shipping frames for plate glass and the like.

As can be seen in Figure 1, the edge of the glass 15 is spaced inwardly from the side walls of the shipping container 17 by the alternate unslotted folded edges of the partially unfolded accordion pleated strip 18. Because of the flexibility of the material and the angular disposition of these unslotted portions of the folds with respect to the edge of the glass they provide a resilient shock absorbing frame around the edge of the glass. Figure 2 discloses that the glass 15 is resiliently suspended by the partially unfolded accordion pleated strip 18 spaced from the bottom of the shipping container 17, and that the strip 18 also provides a protective space above the glass. Since the shipping frame provides a uniform resilient support for the glass around its entire periphery, the use of corrugated packing pads or straw may be entirely unnecessary, except possibly for very large sheets or plates, or for curved sheets or plates.

Figure 3:
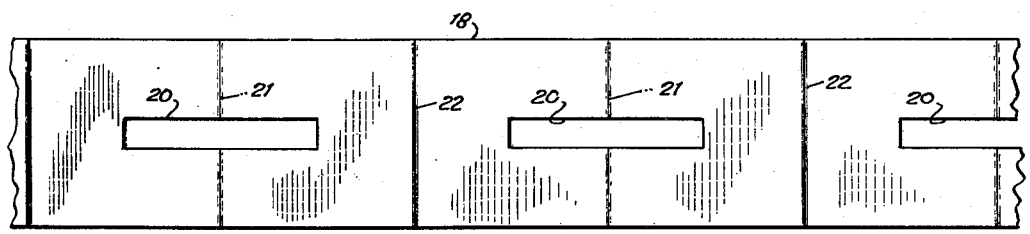
Figure 3 is a top plan view of one of the two strip blanks of which the edge packing is comprised.

The accordion pleated strip 18 is formed from a blank such as is shown in Figure 3. This blank is an elongated strip of sheet material, for example flat paper board, having a series of aligned longitudinally disposed slots 20 which preferably may be centered transversely of the strip. Preferably the length of the slots is substantially equal to the spacing between slots, although this relation may be made different if desired. The blank is scored or creased transversely for folding, alternately on opposite sides, the scorings 21 on one side passing through the centers of the slots 20, and the scorings 22 on the other side lying midway between the slots.

During manufacture of the edge packing the blank will be reversely folded along the scorings to form an accordion pleated strip, the slots 20 forming a groove extending longitudinally along one side of the folded strip. The width of the slots is preferably made equal to the thickness of the plate glass or other material to which the edge packing is to be applied, so that there will be a slight frictional engagement with the glass when its edge is inserted in the slots.

Figure 4:
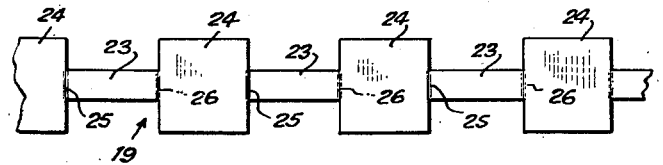
Figure 4 is a top plan view of the other strip blank which is to be assembled in interlocked folding relation with the blank of Figure 3 to form the cushioning edge packing.

The other strip 19 is formed from a blank such as is shown in Figure 4. This blank also is an elongated strip of flat sheet material, for example paper board, and conveniently comprises a series of alternate portions 23 of width equal to or slightly less than the width of the slots 20, separated by integral tab portions 24 of width greater than the slots. Preferably the length of the narrow portions 23 is substantially equal to or very slightly greater than the length of the tab portions 24, and preferably the length of a narrow portion 23, plus the length of a tab portion 24 is substantially equal to the length of one of the folds of the accordion pleated strip 19. By making the narrow portions 23 very slightly longer than the tab portions 24, it will be possible to locate the scorings, to be described, at the ends of the narrow portions. It will be understood that these proportions may be somewhat different if desired.

The blank 19 also is scored transversely at regular intervals for folding, alternately on opposite sides, the scorings 25 preferably being located at one end of the narrow portions 23 at their junction with the tab portions 24, and the scorings 26 being located at the other ends of the narrow portions at their junction with the succeeding tab portions. During manufacture of the edge packing the blank 19 will be reversely folded along the scorings to form an accordion pleated strip, the length of the folds, in the preferred embodiment, being substantially equal to one-half the length of the folds of the accordion pleated strip 18.

In fabricating the edge packing of this invention the blank 18 will be folded into a partially extended accordion pleated strip and the successive tab portions 24 of the blank 19, which may also have been partially folded, will be inserted through successive slots 20 of the blank 18, thus interlocking the two strips more or less as shown in Figure 5. If desired to facilitate inserting the tab portions through the slots, the corners of the tab portions may be rounded, and the tab portions may project unequal distances from opposite sides of the narrow portions 23, or they may project only from one side of the strip 19, these modifications being illustrated in Figure 12.

The folding of the interlocked strips will then be continued progressively through the stage shown in Figure 11 until the strips are compactly folded as shown in Figures 8 and 9. The narrow portions 23 of the strip 19 will lie in the groove formed by the slots 20, and the folds of the strip 18 will lie tightly against each other, alternate folds being separated only by the tab portions 24 of the strip 19. Because of the compact nature of the folded edge packing a minimum of space is required for storage and for shipment to the place of use. The folded edge packing may be cut into lengths and packed in straight pieces in cartons for shipment, or it may be coiled or placed on reels for shipment if desired.

When the edge packing is to be applied to a sheet of glass or the like it will be extended merely by grasping the end of the wider strip 18 and drawing the packing out to the limit of the length of the narrower strip 19, the tabs serving to space the folds of the strip 18 in a uniform saw-tooth arrangement. The extended edge packing will have the appearance as shown in Figures 5, 6 and 7. As the edge packing is extended it is pressed against the periphery of the sheet of glass, the edge of the glass being received and held by the slots 20. Because of the flexibility of the edge packing it can be easily trained around curves and corners, whether angular or rounded as shown in Figure 1, and it is adapted for use on curved sheets of glass as well as on flat sheets. The narrower strip 19 will then lie fully extended along the edge of the glass in the bottom of the groove formed by the slots 20 to protect the edge of the glass and to minimize any possibility that the edge of the glass may cut into the folds of the accordion pleated strip 18. The ends of the edge packing will be connected together to complete the shipping frame for the glass sheet, which then is ready to be placed in a shipping container.

If it is desired to ship a plurality of glass sheets or the like in parallel spaced relation the wider strip of the edge packing may be provided with two or more parallel lines of slots, into each of which is interlocked one of the tabbed narrower strips. Such a construction is shown in Figure 12, where the accordion pleated strip 27 has two parallel lines of slots 20. This figure illustrates modifications in the design of the tabbed strip.

In the illustrative embodiment the tabs projecting laterally from the narrower strip 19 through the slots 20 are formed as integral parts of the strip and this is preferred because it eliminates the need for using adhesive or metal fastening means to secure the tabs to the strip. However, it will be obvious that the strip 19 might be made of uniform width and that the tabs could be secured thereto during the process of interlocking and interfolding the strips.

This invention provides a folded cushioning edge packing for plate glass and the like which may be made from flat strip material such as paper board, which may be fabricated without the use of adhesive or metal, which may be compactly folded for storage and shipment, and which may be easily extended and applied to the edge of the glass to form a shipping frame which resiliently suspends the glass while providing protection around its entire periphery.

It will be understood that the invention herein described may be modified and embodied within the scope of the subjoined claims.

I claim:

1. An extensible, cushioning edge packing for plate glass and the like comprising, in combination, two accordion pleated strips of flat sheet material assembled in interlocked folded relation, one of the accordion pleated strips being wider than the other and having a series of aligned longitudinal slots in alternate folded edges to form a groove extending longitudinally of the folded strip, the narrower accordion pleated strip being located within the groove and having tabs projecting from the edges of alternate folds through successive slots in the wider strip to interlock the two strips while permitting extension thereof to the limit of the length of the narrower strip.

2. A cushioning edge packing for plate glass and the like comprising, in combination, two elongated strips of flat sheet material, each strip being reversely folded along parallel transverse lines to form an accordion pleated member, the length of the folds of one strip being longer than the length of the folds of the other strip, the strip with the longer folds being slotted longitudinally at alternate folds, the other strip being narrower and having alternate portions of width not greater than the slots in the wider strip, separated by tab portions of width greater than the slots, the successive tab portions of the narrower strip extending through successive slots in the wider strip to interlock the two strips in folded extensible relation.

3. An edge packing according to claim 2, in which the lengths of the folds of one strip are substantially twice the length of the folds of the other strip.

4. An edge packing according to claim 2, in which the narrow portions and the tab portions of the narrower strip are substantially equal in length, and in which the fold lines are at the junctions between the narrower portions and the tab portions.

5. An extensible, cushioning edge packing for plate glass and the like comprising, in combination, an elongated strip of flat sheet material having a regular succession of aligned longitudinal slots, the strip being reversely folded along parallel transverse lines with alternate fold lines passing through the slot centers and intervening fold lines lying midway between the slots to form an accordion pleated member having a groove extending longitudinally thereof along one side, a second elongated strip of flat sheet material having a regular succession of alternating narrow and wide portions, the narrow portions being not wider than the slots in the first strip and the wide portions being wider than those slots, the distance from one point on a wide portion to the corresponding point on the next wide portion being substantially less than the distance between the centers of adjacent slots in the first strip, the second strip being reversely folded along parallel transverse lines spaced apart a distance substantially equal to one-half the distance from one point on a wide portion to the corresponding point on the next wide portion to form a second accordion pleated member, the narrower portions of the second accordion pleated member lying within the groove of the first accordion pleated member and the successive wider portions projecting through successive slots in the first strip to interlock the two strips while permitting extension thereof to the limit of the length of the strip forming the second accordion pleated member.

6. An edge packing according to claim 5, in which the spacing between slots in the first strip is substantially equal to the length of the slots.

7. An edge packing according to claim 5, in which the narrow and the wide portions of the second strip are of substantially equal length.

8. An edge packing according to claim 5, in which the distance from one point on a wide portion of the second strip to the corresponding point on the next wide portion is substantially equal to the length of the slots in the first strip.

9. An edge packing according to claim 5, in which the fold lines of the second strip are at the junctions between the narrow and the wide portions thereof.

10. An extensible, cushioning edge packing for plate glass and the like comprising, in combination, an accordion pleated strip of paper board having a series of aligned longitudinal slots forming a groove extending longitudinally of the folded strip in the folded edges on one side thereof to provide a channel for the edge of the plate glass, and a second accordion pleated strip located in the groove and having tab portions projecting from the edges thereof through the slots in the first strip to interlock the two accordion pleated strips while permitting extension thereof.

11. A shipping frame for plate glass and the like comprising a partially extended accordion pleated strip of sheet material, alternate folded edges of which have aligned slots forming a groove in which the edge of the glass is received, and a second strip of sheet material lying in the bottom of the groove extended along the edge of the glass.

12. A shipping frame according to claim 11 which extends entirely around the periphery of the glass.

13. A shipping frame according to claim 11 in which the second strip has tabs projecting from its edges through the slots of the accordion pleated strip to interlock the two strips.

14. A shipping frame according to claim 13 in which the second strip is scored transversely, alternately on opposite sides, substantially at the lines of intersection between the strips.

JAMES M. FREIBERG.

No references cited.